A. H. SCHAFFERT.
SAFETY HANGER FOR BRAKE BEAMS FOR TRACTION CARS.
APPLICATION FILED JAN. 18, 1916.

1,198,064.

Patented Sept. 12, 1916.
2 SHEETS—SHEET 1.

WITNESS
Oscar V. Payne

INVENTOR
Adolf H. Schaffert
Attorneys

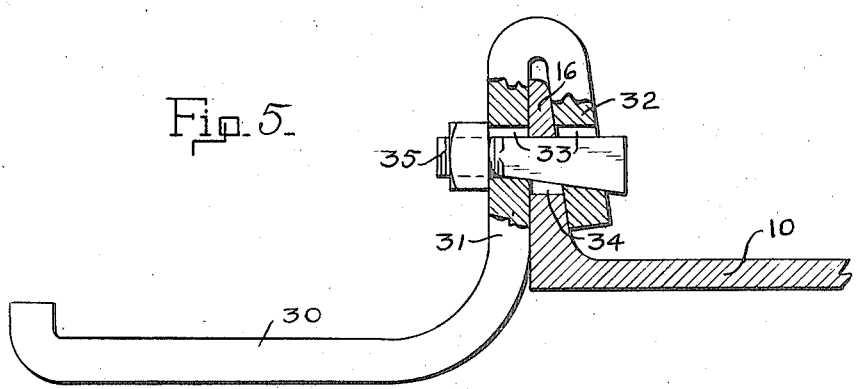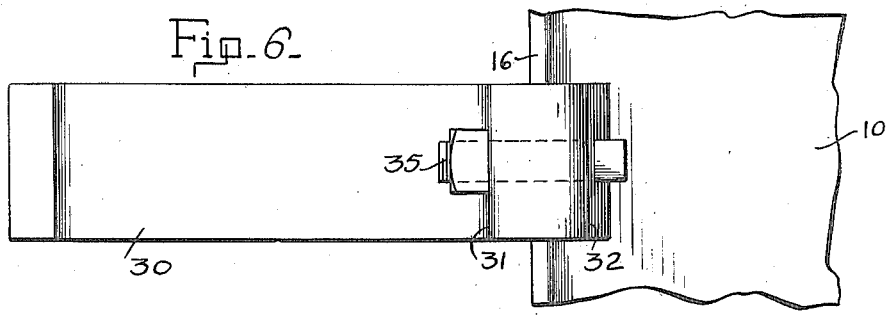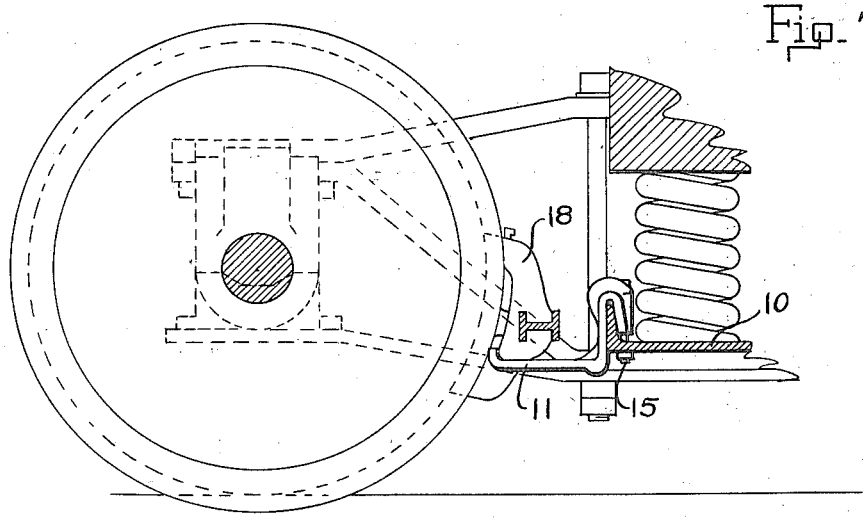

UNITED STATES PATENT OFFICE.

ADOLF H. SCHAFFERT, OF CLEVELAND, OHIO, ASSIGNOR, BY MESNE ASSIGNMENTS, TO DAMASCUS BRAKE BEAM CO., OF CLEVELAND, OHIO, A CORPORATION OF OHIO, (INCORPORATED FEBRUARY 25, 1916.)

SAFETY-HANGER FOR BRAKE-BEAMS FOR TRACTION-CARS.

1,198,064.   Specification of Letters Patent.   Patented Sept. 12, 1916.

Application filed January 18, 1916. Serial No. 72,865.

*To all whom it may concern:*

Be it known that I, ADOLF H. SCHAFFERT, a citizen of the United States, residing at Cleveland, in the county of Cuyahoga and State of Ohio, have invented certain new and useful Improvements in Safety-Hangers for Brake-Beams of Traction-Cars, of which the following is a specification.

The present invention relates to safety hangers for brake beams of traction cars. It has been customary to provide hangers of this description in pairs, and rivet them to the so-called spring board made of channel or angle iron. This permits of no individual adjustment for each hanger and if the hanger should be required to be removed from the spring board, the rivets must first be cut off and this will cause unnecessary loss of time and labor, making the hangers expensive.

The advantage in my invention resides now therein that each hanger may be adjusted in position independent of the others, each hanger constituting a separate member and any or all the hangers may be removed at any time, without loss of material or time, as they are secured by bolts instead of rivets.

Another advantage resides therein that the hanger is so constructed that it fits perfectly over the channel flange of the spring board so that greater strength and more security in fastening is obtained with the same or less amount of material.

In the accompanying drawings, three modifications of my invention are illustrated.

Figure 1:
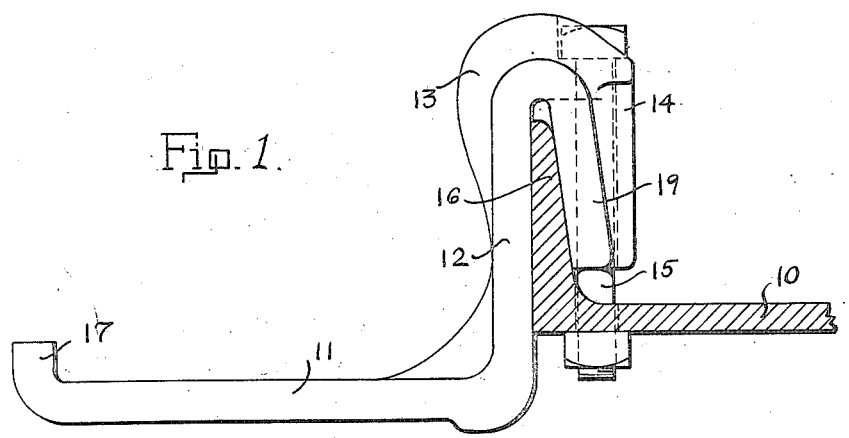
Figure 2:
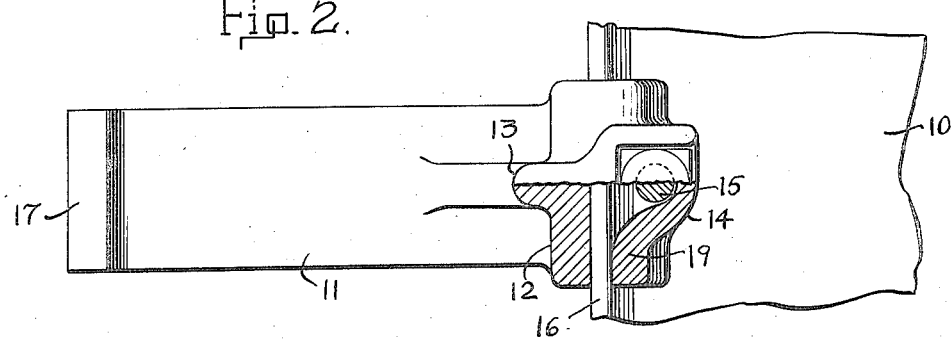
Figure 3:
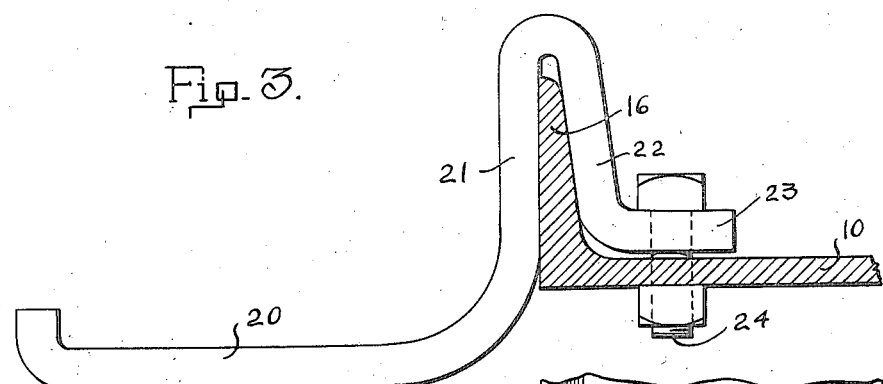
Figure 4:
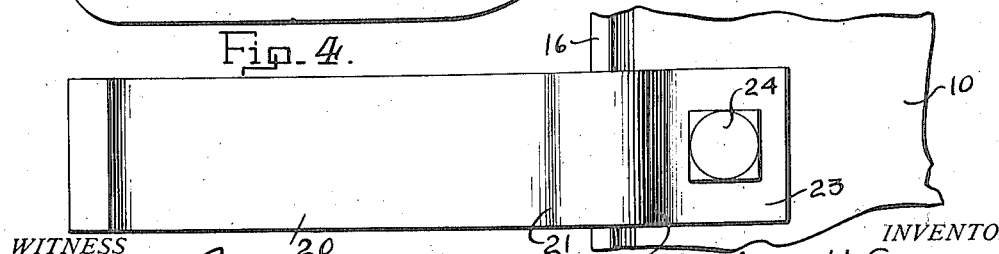

Figure 1 shows in side elevation the preferred form of the invention illustrating a hanger made of cast material; Fig. 2 is a top plan view partially in section of Fig. 1; Fig. 3, a similar view to Fig. 1 of a forged hanger; Fig. 4, a top plan view of Fig. 3; Fig. 5, another form of forged hanger in side elevation partially in section; Fig. 6, a top plan view of Fig. 5, and Fig. 7, an assembled view of the hanger as applied to a trolley car.

Referring now particularly to Figs. 1 and 2, the hanger which is of L shape with its long leg 11 placed horizontally and its short leg 12 abutting against the upright flange 16 on the spring board, is here shown in the shape of a channel. The free end of the longer leg 11 is bent upward as at 17 and the shorter leg is bent double so that a tapered pocket is formed between the horizontal portion 12 and the bent back portion 19. This pocket has the same taper as the wedge-shaped flange 16 of the spring board 10, but enough space is left between the edge of the flange and the bottom of the pocket as well as between the end of the portion 19 and the body of the spring board 10 to permit of necessary downward draw of the hanger. In order to stiffen the short leg 12 at its upper bend, a reinforcing web 13 has been provided, this web ending in a boss 14 forming a seat for the head of a securing bolt 15, providing sufficient play or side motion between the bolt and the seat when the nut of the bolt is tightened beneath the horizontal portion of the spring board 10 which it penetrates.

In Fig. 7 is best illustrated the manner of positioning the hanger 11 in relation to the brake 18 in order to catch the brake beam in case of accident when the brake beam would fall down on the horizontal shelf portion 11 of the hanger and be prevented from sliding off the shelf by the upwardly bent edge 17.

Referring now to the modification shown in Figs. 3 and 4 the shelf or horizontal portion of the hanger is designated as 20, the short leg 21 and the bent back member 22, and the seat 23 for the bolt 24. Even in this case space is provided between the bottom of the pocket and the edge of the wedge-shaped flange 16, as well as between the seat 23 and the horizontal portion of the spring board 10. In both of the described forms illustrated in Figs. 1, 2, 3, 4, the securing bolt is positioned vertically, being only subjected to tension when its nut is tightened to secure the hanger over the flange of the spring board.

The modification illustrated in Figs. 5 and 6 differs from the previous ones by having a horizontally positioned bolt 35. The shelf 30, the short leg 31 and the bent back member 32 are of the same construction as in Figs. 3 and 4, the only difference being that there is no transverse seat at the free end of the member 32. The usual space at the bottom of the pocket between parts 31 and 32 of the short leg is also provided in this case. Now, however, the bolt 35 is made with a taper and correspondingly shaped holes are provided in the flange 16 and the short leg portions 31 and 32. These holes, however, are slightly offset relatively to each other so that the bolt 35 is made to bear against the upper edge of the hole 34 in the flange, but leaving necessary play at the bottom 34, to permit the bolt to draw the hanger downwardly in the flange. For the same reason, the two holes in the short leg are contacting on the underside of the bolt, but standing free on the upper side of the holes 33. On tightening the bolt, it will be obvious that the same wedging action will take place in this case as in the two previous forms described.

I claim:—

1. A safety hanger for car brakes adapted to be supported by embracing a tapered flange on a car truck.

2. A safety hanger for car brakes constructed with the attaching end having a tapered pocket to fit over the wedge-shaped flange of the spring board on a car truck, and means for securely holding the hanger in this position.

3. A safety hanger for car brakes constructed with an attaching member having a tapered pocket to fit over the wedge-shaped flange of the spring board on a car truck, and means for securely holding the hanger in this position, said means comprising a bolt drawing the hanger tightly over the flange.

4. A safety hanger for car brakes, comprising a shelf portion and a clamping portion integral therewith; said clamping portion forming an inverted V fitting closely over the sides of a wedge-shaped flange on a car beam, leaving a space at the edge of said flange, and means for wedging said clamping portion over the flange.

5. A safety hanger for car brakes, comprising a shelf portion and a clamping portion integral therewith; said clamping portion forming an inverted V fitting closely over the sides of a wedge-shaped flange on a car beam, leaving a space at the edge of said flange, and means for wedging said clamping portion over the flange, said means including a bolt through said clamping portion and said car beam.

6. A safety hanger for car brakes, comprising a shelf portion and a clamping portion integral therewith; said clamping portion forming an inverted V fitting closely over the sides of a wedge-shaped flange on a car beam, leaving a space at the edge of said flange, and means for wedging said clamping portion over the flange, said means including a bolt through said clamping portion and said car beam acting in a direction approximately parallel to said flange.

7. A safety hanger for car brakes, comprising a shelf portion and a clamping portion integral therewith; said clamping portion forming an inverted V fitting closely over the sides of a wedge-shaped flange on a car beam, leaving a space at the edge of said flange, and means for wedging said clamping portion over the flange, said means including a bolt-seat on said clamping portion of less length than the depth of the beam-flange, and a bolt engaging said seat and the beam for drawing the seat toward the body portion of the beam.

8. An L-shaped safety hanger for car brakes, one leg of which is doubled over to form a tapered pocket, and means for clamping the said leg and drawing the pocket tight over a correspondingly tapered beam-flange.

9. An L-shaped safety hanger for car brakes, one leg of which is doubled over to form a tapered pocket and to fit with sufficient play in the direction of inclination over a correspondingly tapered beam-flange; a transverse projection on said leg forming a seat, and a bolt engaging said seat and said beam for wedging the pocket over said beam-flange.

10. An L-shaped safety hanger for car brakes, the short leg of which is doubled over to form a tapered pocket, and to fit with sufficient play in the direction of inclination over a correspondingly tapered beam-flange; a boss extending in the direction of inclination, a bolt engaging said boss and said beam for wedging the pocket over said beam flange, there being sufficient play between the beam and the end of said boss for permitting the bolt to draw.

The foregoing specification signed at Cleveland, Ohio, this 28th day of December, 1915.

ADOLF H. SCHAFFERT.